June 22, 1926.
H. CAPLAN
1,589,364
VEHICLE BUMPER
Filed June 6, 1925
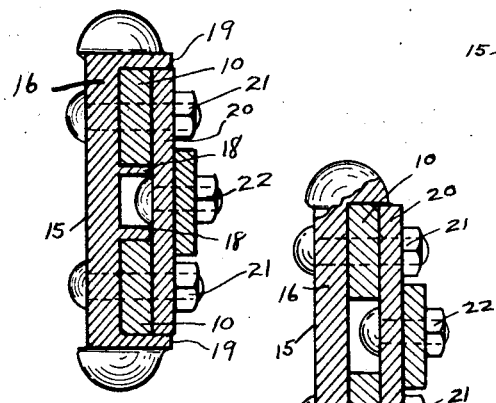
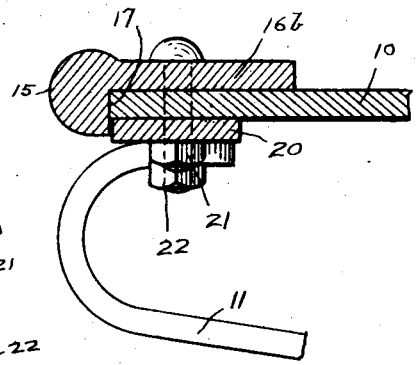
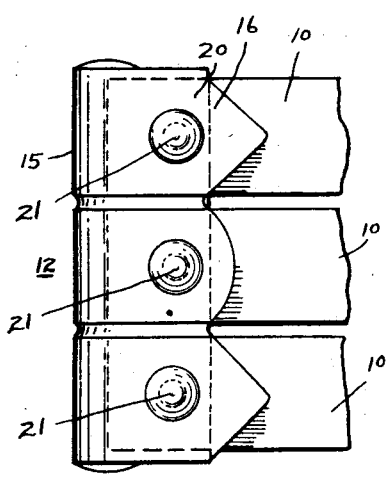
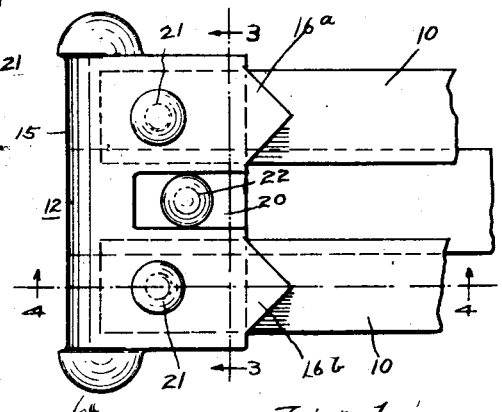
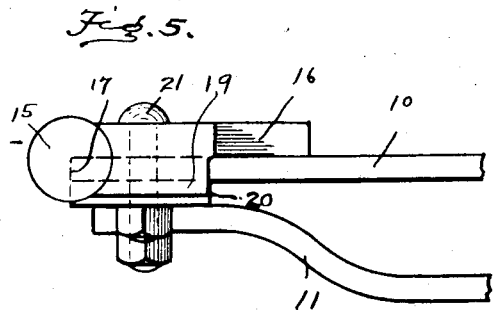
INVENTOR
Harry Caplan
BY
Lucius D. Hardesty
ATTORNEY Patented June 22, 1926.

1,589,364

UNITED STATES PATENT OFFICE.

HARRY CAPLAN, OF DETROIT, MICHIGAN.

VEHICLE BUMPER.

Application filed June 6, 1925. Serial No. 35,303.

The present invention relates to the construction of bumpers for automobiles and more specifically to the end structure of such devices.

Among the objects of the invention is to provide an end structure that may be more economically and accurately made than the ordinary bumper and yet be of great strength and of ornamental appearance.

With these and other objects in view as will be readily apparent to those skilled in the art, the invention consists broadly in a bumper having cross bars joined at their ends to an end piece which holds said bars rigidly in relative position and furnishes means to which the supporting structure may be securely attached.

Reference should be made to the following description and drawings, in which:

Fig. 1 is an elevation of one end of a two bar bumper.

Fig. 2 is an elevation of one end of a three bar bumper.

Fig. 3 is a vertical section of Fig. 1 on the line 3—3.

Fig. 4 is a horizontal section of Fig. 1 on the line 4—4.

Fig. 5 is a view of the structure of Fig. 2 looking from below.

Fig. 6 is a view similar to Fig. 3 of a modified form of end piece.

In the drawings are shown the ends of two forms of bumpers, one having two bars and the other three. The form of end connection is however substantially the same.

In these bumpers, the bumper bars or cross bars are indicated at 10, a bracket or support member at 11 and means for joining the bars and bracket indicated as a whole by numeral 12.

The joining means or end piece 12 consists of a body portion 15 having enlarged ends 15ª and a longitudinal flange 16, which, in the case of the two bar bumper may be in two spaced portions 16ª and 16ᵇ. This flange 16 is tangential to the body and forms on one side a seat or seats for one or more of the bars 10, a flattened portion 17 on the body forming an abutment portion of the seat for the bar end. Further ribs 18 may be formed on the flange 16 to separate the individual seats and there may be end ribs 19 defining the edges of the outer seats. These ribs 18 and 19 serve to guide and space the bars in assembling. They also obviate any tendency for the end piece to turn on the bars.

On the rear side of the end piece the seats are open as indicated and when the bars 10 are in position all of the seats are closed upon the bars by a single closure plate 20 which is bolted to the end piece by through bolts 21 passing through plate 20, bars 10, and flange 16.

The bracket member 11 is then bolted, in the case of the two bar bumper, to the plate 20 by a bolt 22 passing through the member and plate, the head of bolt 22 lying between the parts 16ª and 16ᵇ of the flange.

In the case of the three bar bumper, the middle bolt 21 secures the bracket member 11 as well as the closure plate 20 and bar 10, to the end piece 12.

In the usual construction end piece 12 may be a forging or it may be a casting of malleable iron, although other metals may be used, while the other parts will be of steel.

In the form of end piece shown in Fig. 6, the ribs 18 are omitted as these are used mainly for the purpose of assembly and appearance. Further, the shoulders 19 have been omitted save for so much as is formed by the overhang of the rounded end of the piece.

Having now described the invention and the preferred form of embodiment, it should be understood that it is not to be limited to the precise details herein disclosed but only by the scope of the claims which follow.

Claims:

1. A vehicle bumper comprising a plurality of resilient metal bars, a supporting bracket member and means for attaching the bars to the bracket member, said means consisting of a separate end piece provided with individual seats for the bar ends, the seats being open on one side, a seat closure member, means for securing the bar ends and closure member to said end piece and means for securing said bracket member to the closure member.

2. A vehicle bumper comprising a plurality of resilient metal bars, a supporting bracket member and means for attaching the bars to the bracket member, said means consisting of a separate end piece provided with an individual seat for each bar end, each seat being open on one side, a single closure member for all of said seats, means for securing said closure member and the several bar ends to the end piece and means for securing the bracket member to said closure member and to the end piece.

3. A vehicle bumper comprising a plurality of resilient metal bars, a supporting bracket member and means for attaching the bars to the bracket member, said means consisting of a separate end piece provided with individual spaced seats for the bar ends, the seats being open on one side, a seat closure member, means for securing the bar ends and closure member to said end piece and means for securing said bracket member to the closure member.

4. An end piece for bumpers comprising a body portion having a longitudinal flange and enlarged ends, said piece having a seat for the ends of spring bumper bars, said seat being defined by said flange, the body portion and the enlarged ends.

5. An end piece for bumpers comprising a body portion having a longitudinal flange, seats formed by said flange and said body portion and separating ribs for said seats on said flange.

6. An end piece for bumpers comprising a body portion having a longitudinal flange, seats formed by said flange and said body portion, ribs on said flange for separating said seats and end ribs on said flange for defining the outer edges of the outer seats.

HARRY CAPLAN.